US009269274B1

(12) United States Patent
Hu

(10) Patent No.: US 9,269,274 B1
(45) Date of Patent: Feb. 23, 2016

(54) COURSE CONTENT AND ASSIGNMENT DISTRIBUTION

(75) Inventor: Luhui Hu, Bothell, WA (US)

(73) Assignee: Amazon Technologies, Inc., Seattle, WA (US)

( * ) Notice: Subject to any disclaimer, the term of this patent is extended or adjusted under 35 U.S.C. 154(b) by 868 days.

(21) Appl. No.: 12/888,204

(22) Filed: Sep. 22, 2010

(51) Int. Cl.
*G09B 5/00* (2006.01)
*G09B 7/00* (2006.01)
*G09B 5/06* (2006.01)

(52) U.S. Cl.
CPC .. *G09B 5/062* (2013.01); *G09B 7/00* (2013.01)

(58) Field of Classification Search
CPC ............ G09B 5/062; G09B 7/00; G09B 7/02; G09B 7/04; B42D 3/123
USPC .......... 434/317, 323, 350, 362, 308, 322, 365
See application file for complete search history.

(56) References Cited

U.S. PATENT DOCUMENTS

| 5,294,229 | A | * | 3/1994 | Hartzell et al. | 434/336 |
| 6,091,930 | A | * | 7/2000 | Mortimer et al. | 434/362 |
| 6,149,441 | A | * | 11/2000 | Pellegrino et al. | 434/350 |
| 6,554,618 | B1 | * | 4/2003 | Lockwood | 434/322 |
| 6,877,987 | B2 | * | 4/2005 | Kulack | 434/118 |
| 2003/0044760 | A1 | * | 3/2003 | Banerjee et al. | 434/350 |
| 2003/0059760 | A1 | * | 3/2003 | Tojek et al. | 434/322 |
| 2005/0266388 | A1 | * | 12/2005 | Gross et al. | 434/350 |
| 2007/0020604 | A1 | * | 1/2007 | Chulet | 434/350 |
| 2007/0196807 | A1 | * | 8/2007 | Packard et al. | 434/350 |
| 2008/0014569 | A1 | * | 1/2008 | Holiday et al. | 434/351 |
| 2009/0047650 | A1 | * | 2/2009 | Leuck et al. | 434/350 |
| 2009/0181356 | A1 | * | 7/2009 | Dasgupta | 434/362 |

\* cited by examiner

*Primary Examiner* — Peter Egloff
(74) *Attorney, Agent, or Firm* — Lee & Hayes, PLLC

(57) ABSTRACT

An electronic content distribution system may include functionality for defining and tracking instructional classes. Assignments may be created for an instructional class, defining electronic content that is to be consumed as part of the assignment. Assignments may be presented to students on devices that the students use for consuming electronic content, such as handheld eBook readers. In addition, the listed assignments may allow the students to easily open the electronic content specified by the assignments, for consumption and study using the same device.

28 Claims, 5 Drawing Sheets

COURSE CONTENT AND ASSIGNMENT DISTRIBUTION

BACKGROUND

A large and growing population of users is consuming increasing amounts of digital content, such as music, movies, audio books, electronic books, executables, and so on. This is particularly true in academic environments, which are often dominated by younger people who are very comfortable with electronic media.

The widespread adoption of handheld computing devices, such as smartphones, notebook computers, tablet/slate computers, and dedicated electronic book reading devices, has further encouraged the electronic distribution and consumption of media. Increasingly, academic textbooks are available electronically for viewing on handheld readers or other devices.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items.

DETAILED DESCRIPTION

This disclosure describes systems, devices, and techniques in which an instructor can define a class by identifying students, electronic content, and assignments regarding the electronic content. Students having electronic readers, such as electronic book reader devices, can receive the assignments and any electronic content specified by the assignments. The assignments can be presented on the students' electronic readers in a calendar format that lists assignments and associated electronic content. Students can refer to the calendar to determine which electronic content they should be reading or studying at any particular time, and can interact with the calendar to open any desired electronic content.

Students may be asked for permission to monitor their progress through assigned content. Assuming such permission is granted, the electronic readers may monitor and report activities of the students with regard to the assigned electronic content. For example, an electronic reader may log navigation by the student, such as opening content, turning pages, and so forth. This information may be reported and used to determine assignment status for individual students. Assignment status may indicate whether students have started and/or finished assignments. Assignment status may also indicate various other metrics about a student's engagement with assigned content, such as reading speed, reading thoroughness, annotations, highlighting, comprehension, and so forth. Information from multiple students can be compiled and reported to the class instructor. Selected information may also be shared among students in some implementations.

Assignment Distribution and Monitoring Architecture

Figure 1:
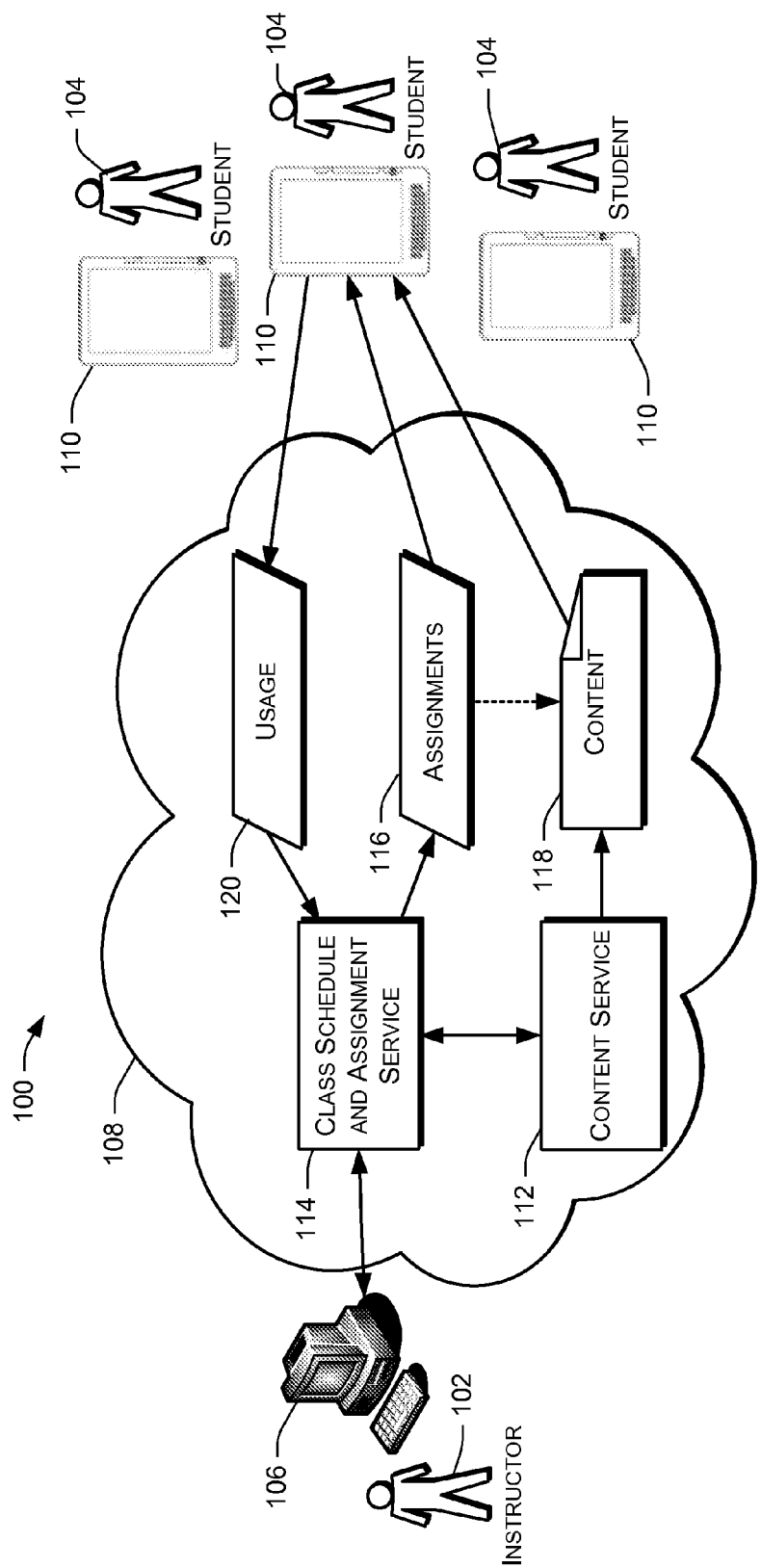
FIG. 1 is an illustrative architecture for distributing assignments and related electronic content, and for monitoring completion of the assignments.

FIG. 1 shows an online environment 100 in which these techniques may be practiced. The online environment 100 includes an instructor 102 and a plurality of students 104, all of whom are assumed to be members of a particular instructional class. Although FIG. 1 illustrates a single instructor 102 and three students 104, a single class might have multiple instructors and any number of students. Furthermore, the illustrated system may support a plurality of different instructional classes, each potentially involving different instructors and students.

The instructor 102 has access to a computer 106 or other computer-like device such as a desktop computer, laptop computer, tablet computer, terminal, etc. In the embodiment shown, the computer 102 has network capabilities and a network browser for accessing a data communications network such as the Internet, illustrated in FIG. 1 by a cloud 108. Note that the network 108 may be any type of communication network, including a local-area network, a wide-area network, a wireless wide-area network (WWAN), a cable television network, a wireless network, a telephone network, combinations of the foregoing, etc.

The students 104 each have an electronic reader 110, having a display upon which electronic content such as electronic books (eBooks) may be rendered. The term "eBooks" may include any sort of textual materials, such as books, periodicals, documents, papers, instructional materials, and the like. Other content may also be consumed on electronic readers 110, such as movies, audio, and audio books.

The electronic readers 110 may be handheld devices such as dedicated eBook reader devices or other small, lightweight, portable devices upon which eBooks and other content can be rendered and conveniently viewed in a manner similar to viewing a paper book. Examples of other handheld electronic readers include flat form-factor devices such as tablets, smartphones, personal digital assistants (PDAs), etc.

In the example of FIG. 1, the electronic readers 110 have networking capabilities. For example, the electronic readers 110 may have wireless communication interfaces that allow communication though the network 108. The wireless communications interfaces may utilize WiFi, cellular, or other wireless data technologies.

Note that in some embodiments, the electronic readers 110 may comprise dedicated-purpose eBook reader devices, having flat-panel displays and other characteristics that mimic the look, feel, and experience offered by paper-based books. For example, such eBook reader devices may have high-contrast, black-and-white, flat-panel displays that appear similar to a printed page and that persist without frequent refreshing. Such displays may consume very negligible amounts of power, so that the eBook reader devices may be used for long periods without recharging or replacing batteries. In some instances, these readers employ electrophoretic displays.

Each electronic reader 110 may be configured with account information corresponding to a particular student 104. Each student may have multiple electronic readers, which may synchronize with each other so that a student may stop reading on a first device and continue reading on a second device, at the same location that the student left off in the first device.

Electronic readers 110 may be configured to allow students to conveniently browse for content and content items, and to purchase and download selected content items. A content item may be essentially any form of electronic data that may be consumed on a device, such as digital books, electronic magazines, journals, periodicals, documents, instructional materials, course content, music, movies, and so on. A content item may also be composed of multiple portions, such as units, chapters, sections, pages, tracks, episodes, parts, subdivisions, scenes, intervals, periods, modules, and so forth.

In the configuration illustrated by FIG. 1, content items may be obtained from an online content service 112. The content service 112 may be accessed using the networking capabilities of the electronic readers 110. The content service 112 may be accessible through other means as well, such as by connection to intermediary devices like personal computers, different types of mobile devices, and so forth.

Various applications and user interfaces may be used in conjunction with the electronic readers 110 to interact with the content service 112, such as various Internet browser programs that allow a user to interactively engage various online services. In addition, the content service 112 may expose various lower-level interfaces or APIs (application programming interfaces) through the network 108, through which devices and programs can access the underlying functionality of the content service 112 without direct user interaction. For example a student may interactively purchase an eBook or other content item using a personal computer or some device other than the electronic reader device 110. Electronic reader 110 may periodically communicate with the content service 112 to perform background synchronization or other housekeeping, and may automatically (without specific user intervention) download any content that has been purchased.

The online environment 100 may also include a class schedule and assignment service (CSAS) 114. The CSAS 114 may be associated with the content service 112, or may be independent. In the illustrated embodiment, the CSAS 114 is an online or cloud-based service that is accessible to both instructors and students through the network 108. Appropriate security techniques may be utilized to authenticate users and to protect against unauthorized access.

The CSAS 114 may be accessible to both instructors and students by way of conventional web browsing technologies, including various types of Internet browsers. In addition, the CSAS 114 may expose programmatic interfaces or APIs intended for use by remote devices independently of specific user navigation. For example, as will be described below, the electronic readers may be configured to connect autonomously to the CSAS 114 to obtain class assignments and to report assignment status.

Note that both the content service 112 and the CSAS 114 may be configured to use cloud-based online storage services for both content items and assignments. The cloud-based storage services may be hosted apart from the content service 112 and the CSAS 114.

The CSAS 114 interacts with the instructor 102 to define classes in terms of students, content or content items, and assignments relating to the content items. More specifically, the instructor 102 may use a web browser to access the CSAS 114 and to define an instructional class or study course. The instructor may utilize the computer 106 for this purpose, or may utilize an electronic reader of his or her own. Furthermore, in some situations the instructor may use an electronic reader 110 belonging to or being used by one of the students 104.

The instructor 102 may define a class by specifying or identifying a list of students 104 who are members of the class. The students 104 may be identified by a unique identifier such as a user ID. In some cases, the students 104 may be identified by selecting them from a list of students who are known to be attending a specific institution. In other cases, the instructor 102 may specify email addresses or other online identifiers associated with the students 104, or may specify addresses or identifiers associated with the electronic readers 110 of the students.

A class may also be defined by one or more assignments 116 that are to be completed by the class students 104. The assignments 116 may relate to various tasks, but in particular may specify reading assignments in terms of textual or other electronic content that the class students 104 are to read and/or study. The assignments 116 may also have associated dates, such as start dates, target dates, and/or due dates. In some embodiments, the assignments 116 may comprise a schedule of assignments, in which each assignment is associated with a due date or other date. Furthermore, estimated activity times may be associated with each assignment 116, indicating the estimated time it will take a student to complete the assignment.

The schedule of assignments may be defined by the instructor 102 at the beginning of a class, and may thus include multiple future assignments. Additional assignments may also be added later, as the class progresses.

Each of the assignments 116 potentially identifies electronic content that is the subject of the assignment. In FIG. 1, the illustrated assignment 116 identifies or references content 118, which may be a content item, a plurality of content items, a portion of a content item, or multiple portions of one or more content items. In this example, it is assumed that the content 118 comprises electronic content that is available from the content service 112. However, specified content might be available from many sources, including various Internet sources. The content 118 may be specified in terms of an Internet URL (uniform resource locator) or by some other identifier such as a product ID.

The electronic readers 110 are configured to interact with the CSAS 114 to receive assignments for the students 104. In the described embodiment, each student within a particular class receives the same schedule of assignments 116. The electronic readers 110 can be configured to present the assignments in one of various calendar formats, according to the dates associated with the assignments 116. For example, some electronic readers 110 might maintain internal calendar or appointment applications. In these cases, assignments can be integrated with the internal calendar or appointment applications, and shown along with other tasks, events, and appointments. In other cases, a special-purpose calendar or scheduling application might be configured to be loaded onto the electronic readers 110 and executed by the readers to show assignments 116.

The electronic readers 110 may be configured to give alerts in conjunction with assignments 116. Alerts may be given upon approaching due dates or deadlines, or when assignments become current. Alerts may comprise visual or audible notifications, or may be implemented using some type of messaging technique such as email.

Assignments 116, when displayed by electronic readers 110, may be associated with links or pointers to the content 118 associated with the assignments, so that selecting a graphical representation of an assignment 116 directs the user to the linked content 118. In certain implementations, the assignment 116 may be selected by moving a cursor to it and activating a selection input such as a mouse button or input key. In touch-screen implementations, an assignment 116 may be selected by simply touching its graphical representation. Upon selecting an assignment, its associated content can be automatically opened and displayed by electronic reader 110.

Figure 2:
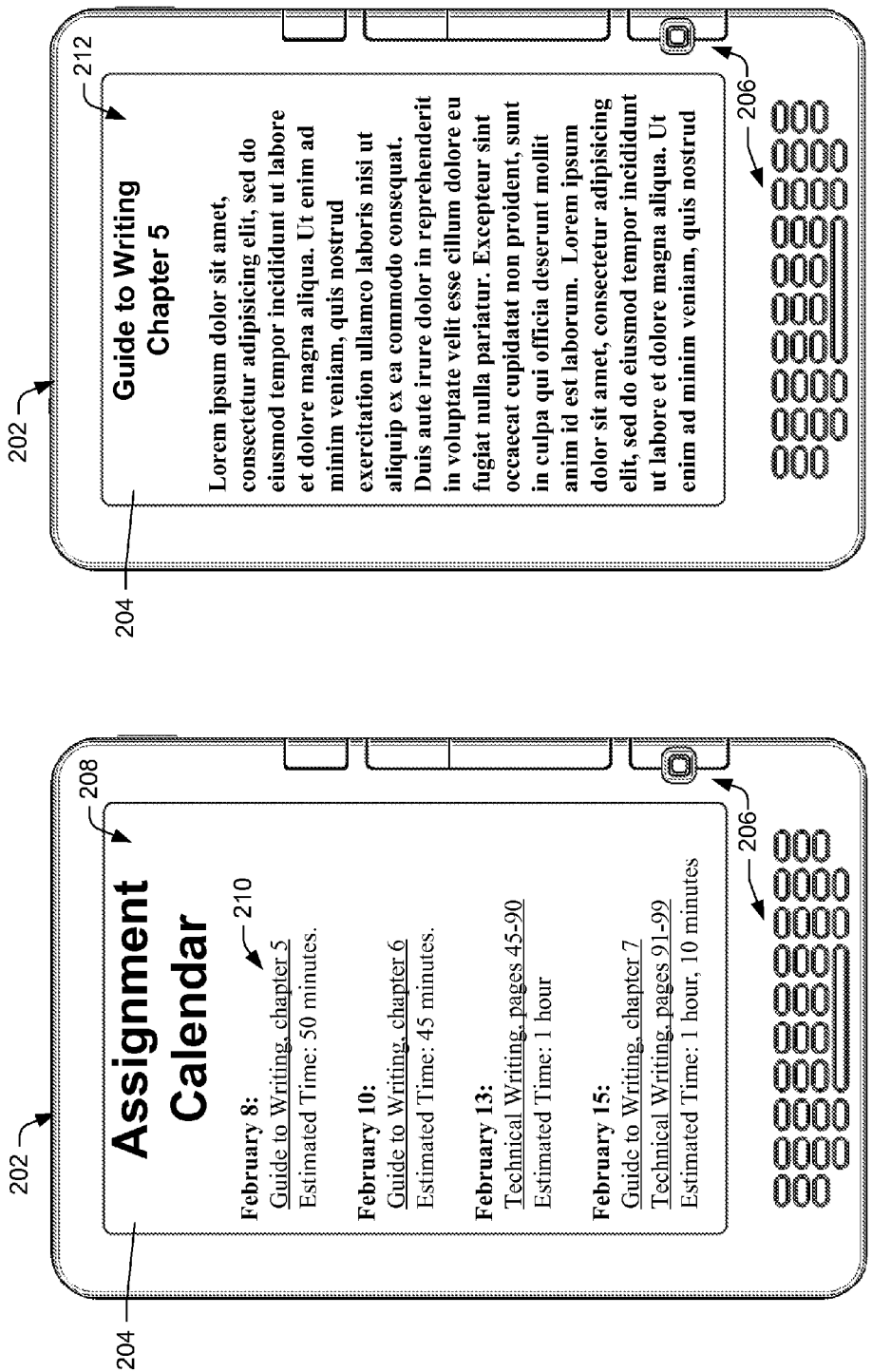
FIGS. 2A and 2B are figurative representations of display screens rendered by an electronic reader to present assignments and content to a student.

FIGS. 2A and 2B show an example of how a schedule of assignments might be presented to a user of the electronic reader 110 and how it might be used for navigation to assigned content. As an example of a reader device 110, FIGS. 2A and 2B show an eBook reader device 202 having a flat-panel display 204 upon which eBooks and other electronic content can be rendered. The eBook reader device 202 also has various input buttons 206 that can be used for user navigation and other user interface activities.

In FIG. 2A, a simplified example of an assignment calendar 208 is shown as being displayed on the flat-panel display 204. In this example, the assignment calendar 208 is formatted linearly, from top to bottom, showing a schedule of assignments for several upcoming days. On February 8, for example, the assignment calendar 208 shows an assignment 210, "Guide to Writing: chapter 5", indicating that the student is to read chapter 5 of the content item entitled "Guide to Writing". The assignment also indicates an estimated reading time: "Estimated Time: 50 minutes". Similarly formatted assignments for later days follow the assignment 210.

Assignments can be identified within the assignment calendar 208 in various ways. Content items can be identified by title, author, and/or other descriptive terms. Portions of content items that the students are to read can be indicated by chapters, sections, pages, columns, lines, etc.

Depending on the specific embodiment, the CSAS 114 or the assignment calendar 208 may generate alerts and/or notifications upon receiving new assignments or assigning new assignments to users. Alerts or notifications may include sounds, visual displays, vibrations, or other types of alerts that are implemented on the eBook reader device 202 itself Alternatively, alerts or notifications might be through some other means, such as by text messages or email.

Within each assignment, the assigned content is underlined or annotated in some other way to indicate that it can be selected by the user. Selecting an assignment opens the assigned content item to the indicated portion. Selecting the assignment 210 for February 8, for example, opens the content item "Guide to Writing", and moves to the beginning of chapter 5 within that content item. This is indicated by FIG. 2B, in which the content is indicated by reference numeral 212. Thus, in the embodiment illustrated by FIGS. 2A and 2B, content 212 is rendered in response to interaction by the student with the assignment calendar 208.

The assigned content 118 can be downloaded or streamed to electronic readers 110. In some implementations, the assigned content 118 is identified, downloaded, and cached by electronic readers 110 automatically, upon receiving the assignments 116. In other implementations, downloading and caching may be deferred until the user selects an assignment, or content may be streamed or downloaded on demand upon selection of an assignment or upon navigation through a content item. In some cases, assignments may refer to online resources such as web pages. In these cases, selecting an assignment may open a browser that is directed to the web page or other online resource.

Referring again to FIG. 1, the CSAS 114 may be configured to monitor interaction of individual students 104 with assigned content 118. Assuming the students have given permission, the CSAS 114 may receive device usage notifications or reports 120 from individual electronic readers 110 that indicate various different types of actions and interactions by the students 104 with respect to the assigned content 118. For example, device usage notifications might indicate which content item a user views, time periods when a user views a particular content item, navigation from one page to another (page turns), particular portions of a content item that are viewed, length of time viewing individual pages, and so forth. The CSAS 114 may monitor this information to determine activities of the students 104 with respect to the assignments 116. For example, the CSAS 114 may determine based on the received usage reports 120 that a student 104 has started reading the content 118 associated with the assignment 116, or that the student 104 has completed the content 118. Assignment status corresponding to different students and assignments be summarized and reported to the instructor 102.

Operation

Figure 3:
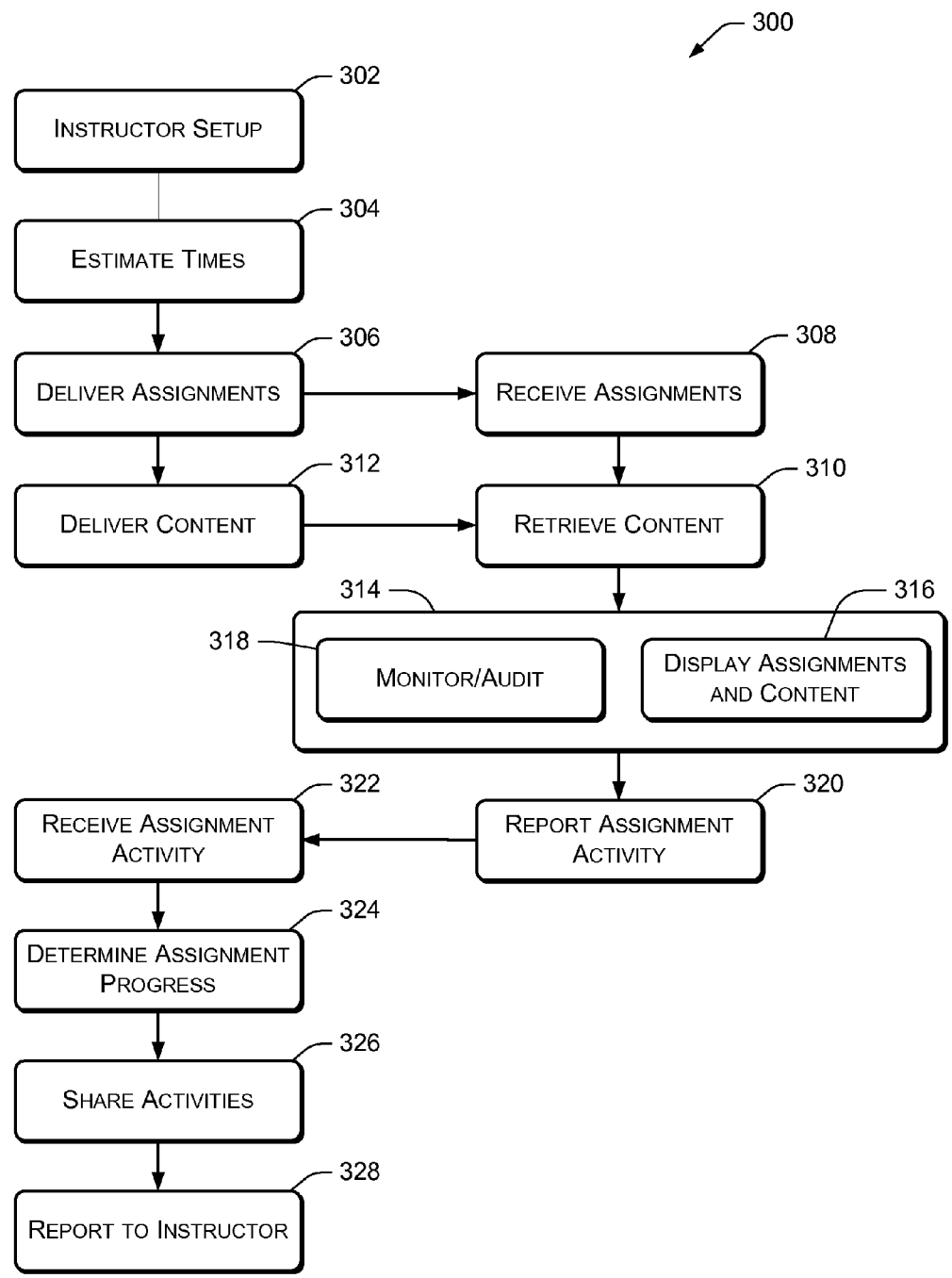
FIG. 3 is a flow diagram of an illustrative process of distributing assignments and related electronic content, and for monitoring completion of the assignments.

FIG. 3 illustrates examples of the techniques above in the form of a flowchart. Within FIG. 3, blocks on the left side indicate actions that might be performed at one or more servers or by one or more services, such as by the content service 112 and the CSAS 114 of FIG. 1. Blocks on the right side indicate actions that might be performed by an electronic reader such as one of the electronic readers 110 of FIG. 1.

At 302, the instructor 102 sets up a class by identifying the class students 104, the class assignments 116, and any content 118 associated with the assignments. This action may be performed once, at the beginning of a class, or iteratively over time as a class progresses and the instructor identifies more assignments and content.

Assignments may be specified by class instructors in terms of content items and portions of those content items. Content items may comprise published content items such as eBooks that are available from online merchants and other sources. Content items may also comprise materials generated or provided by the instructor 102 that are not necessarily publicly available. Instructor-provided materials may include textual materials such as notes, comments, outlines, etc., as well as illustrations, figures, graphics, and other materials.

Furthermore, content 118 may comprise surveys or questions that accompany assigned reading materials, such as comprehension questions designed to be answered by students after completing the assigned reading materials.

At 304, activities times are estimated for each assignment, indicating the estimated time to perform or complete each assignment. Estimated times may be provided by the instructor 102 during setup, or may be estimated by the CSAS 114 based on length and other characteristics of the content items associated with the assignments. In some embodiments, the usage notifications and reports 120 may allow the CSAS to estimate reading speeds of individual users, so that individual activity time estimates for each student may be provided based on the actual monitored or observed reading speeds of those students.

At 306, the assignments 116 are delivered to the students 104 via their electronic readers 110. At 308, the assignments 116 are received by the respective electronic readers 110. In some embodiments, the assignments 116 may form a schedule of assignments, being associated respectively with start dates, activity time estimates, and/or due dates.

In the embodiments described herein, the assignments 116 are transferred over the network 108 to the electronic readers 110, which are equipped for wireless reception of various data and communications. In other embodiments, the transfer of assignments 116 may involve an intermediary device such as a personal computer or removable storage card, from which the assignments are transferred to respective electronic readers during updating or synchronization procedures.

At 310, in response to the receiving 308, the electronic readers 110 retrieve or receive any content 118 referenced or identified by the received assignments 116. Correspondingly, a server component such as the content service 112 delivers the content 118 at 312. Content may be also be retrieved from other sources. In some cases, retrieving the content may involve a purchase transaction by the student 104. In other cases, the content may have already been paid for, or it might be available without charge from the instructor 102 or from the institution sponsoring the class.

Retrieving the content 118 may be performed immediately or soon after receiving the assignments 116. Alternatively, the retrieval may be deferred, and performed on-demand when the student attempts to read or view the content. Content may be cached in its entirety on the electronic reader 110, or indicated portions of content may be retrieved and cached. In some cases, content may be viewed as web pages, and retrieved page by page as the user navigates. Content may also be streamed.

At 314, the electronic reader 110 responds to navigation from the student 104. More specifically, at 316, the electronic reader 110 displays or otherwise renders assignments and content in response to user navigation. Assignments and content may be displayed as described with reference to FIGS. 2A and 2B, or using various different layouts and navigational schemes. Assignments may be displayed in a calendar or schedule format, in accordance with start dates and/or due dates. Estimates of activity times may be indicated, as well as actual progress information.

In addition, at 318, some embodiments may monitor student interaction with the electronic content. More specifically, the electronic reader 110 and the CSAS 114 may, with permission of the students 104, monitor user navigation and consumption activities by keeping a log of user consumption activities. For example, the electronic reader 110 may log the rendering or viewing of each page of any assigned content 118. In some embodiments, logging may be more detailed or granular, and may include the time each page is viewed or the rate of content consumption (reading speed).

Also at 318, the electronic reader 110 may prompt a student to indicate whether an assignment has been completed, and may audit student-provided completion information by asking the student to obtain an input from a parent or other person, verifying that the student has consumed and actively engaged with the assigned content. For example, the parent may be requested to enter a pre-specified secret code, indicating that the student has completed the assigned content. The electronic reader may also solicit answers to any comprehension questions that have been supplied by the class instructor.

At 320, user navigation and/or assignment activities are reported to the CSAS 114. These activities may include the results of the monitoring 318, such as usage notifications, logs of viewing activities with respect to assigned content, completion or progress information provided by the student, and/or audit information such as confirmation by a parent. The assignment activities may alternatively indicate higher level information such as assignment status. Assignment status may simply indicate whether the student has started or completed an assignment, or may indicate the percentage of the assignment that has been completed.

Assignment activity information may also include highlighting and underlining made by the student with respect to assigned content, and/or notes or annotations made by the student. Assignment activity information may also include answers to comprehension questions supplied by the class instructor.

The CSAS 114 receives the assignment activity information at 322, and at 324 determines assignment progress. Assignment progress may be indicated specifically in the assignment activity information received from the electronic reader 110, or it may be inferred from more granular assignment activity information. For example, the electronic reader 110 may report which pages of specified content have been viewed, and the CSAS 114 may compare that information with the assignment information to determine whether the assignment has been completed. An assignment may be deemed to have been completed if all pages of the assigned content have been viewed.

More sophisticated monitoring may be employed to thwart cheating and to provide more information to instructors, such as verifying that a minimum amount of time was spent viewing each page.

At 326, certain assignment activities may be shared with the instructor 102 or with other students 104. As a specific example, the activities reported by the electronic reader 110 at 320 may include annotation and highlighting information, such as specific portions of the assigned content that were highlighted or underlined by each student, and annotations or notes made by each student. This type of information may be shared among students for comparison and learning, and may also be shared with the instructor.

At 328, user navigation and/or assignment status information is reported to the instructor 102. As noted above, the assignment information may include whether assignments have been started or completed based on the monitoring 318. The assignment activity information may indicate the percentage of completion for partially completed assignments. In addition, assignment activity may be summarized for a plurality of the students, and may include statistics such as average completion rate or average scores.

Although a relatively simple mechanism for monitoring student assignment progress is described above, other embodiments may employ more sophisticated mechanisms, and may utilize additional reader functionality and cloud-based services. Monitoring techniques that may be used in conjunction with the techniques described herein are described in the following co-pending United States Patent Application, which is hereby incorporated by reference: "Content Usage Analysis and Recommendations", filed Jun. 30, 2009, having Ser. No. 12/495,061.

Electronic Reader Device

Figure 4:
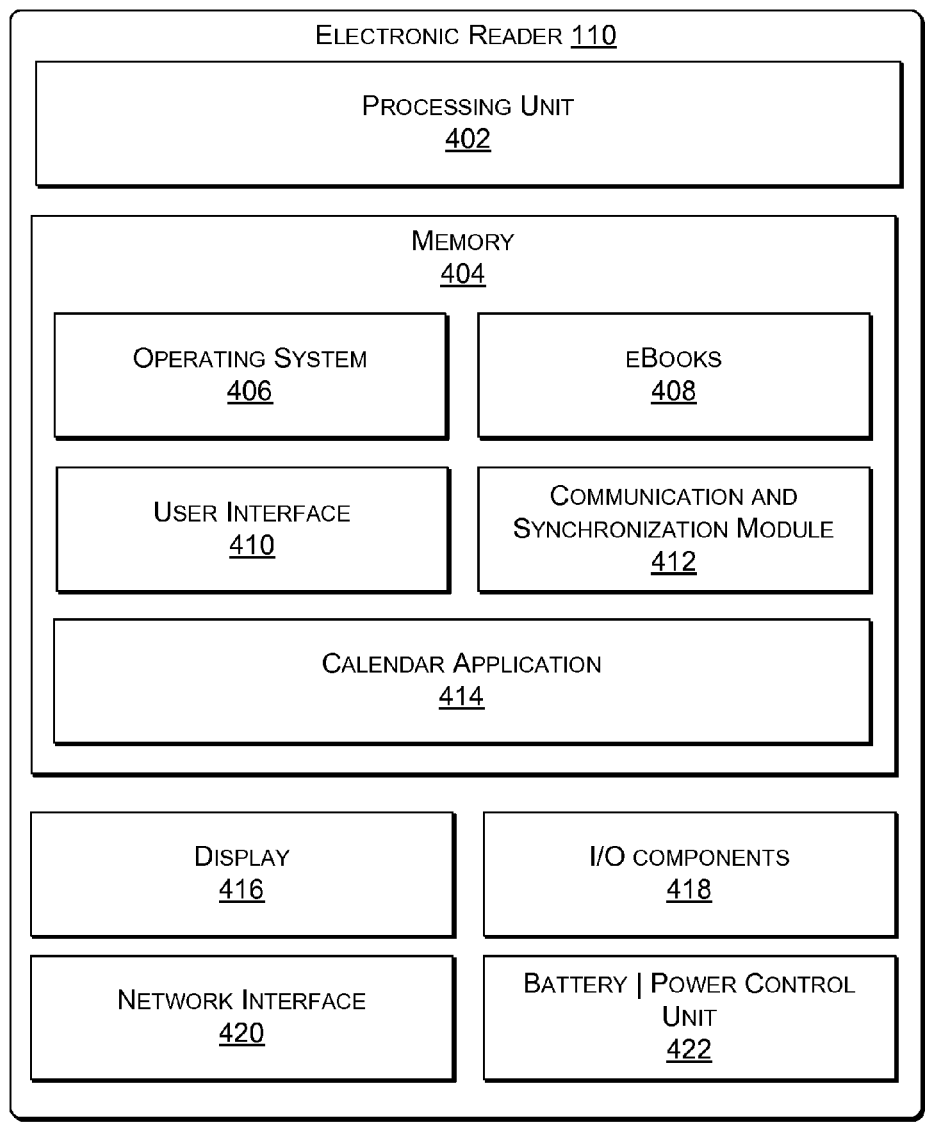
FIG. 4 is a block diagram illustrating components of an electronic book reader device that may be used in conjunction with the techniques described herein.

FIG. 4 illustrates relevant components that might be implemented in electronic reader 110. In this embodiment, the electronic reader 110 is a dedicated, handheld eBook reader device equipped with a display to display eBooks.

In a very basic configuration, the electronic reader 110 includes a processing unit 402 composed of one or more processors, and memory 404. Depending on the configuration of the electronic reader 110, the memory 404 is an example of computer storage media and may include volatile and non-volatile memory. Thus, the memory 404 may include, but is not limited to, RAM, ROM, EEPROM, flash memory, or other memory technology, or any other medium which can be used to store media items or applications and data which can be accessed by the eBook reader device 110.

The memory 404 may be used to store any number of functional components that are executable on the processing unit 402, as well as data and media items that are rendered by the electronic reader 110. Together, these elements can form operational logic for implementing the functionality described above.

The memory 404 may store an operating system 406 and an eBook storage database to store one or more media items, such as eBooks 408 and audio books. A user interface module 410 may also be provided in the memory 404 and executed on the processing unit 402 to provide for user operation of the electronic reader 110. The UI module 410 may provide menus and other navigational tools to facilitate selection and rendering of content items, such as the eBooks 408. The UI module 410 may further include a browser or other application that facilitates access to sites over a network, such as websites or online merchants, or other sources of electronic content items or other products.

The UI module 410 may include a content presentation application that renders the content items. The content presentation application may be implemented as various applications depending upon the content items. For instance, the application may be an electronic book reader application for rendering electronic books, or an audio player for playing audio books, or a video player for playing video, and so forth.

A communication and synchronization module 412 is stored in memory 404 and executed on the processing unit 402 to perform management functions in conjunction with the content service 112 and the CSAS 114. The communication and synchronization module 412 communicates with the content service 112 to receive the eBooks 408 and with the CSAS 114 to obtain assignments and to provide user activity information such as assignment status.

As discussed above, the electronic reader 110 may also have a calendar or appointment application 414 that can be utilized to display the schedule of assignments. The calendar application 414 may be configured to generate alerts and/or notification as assignment due dates approach.

The electronic reader 110 may further include a display 416 upon which electronic books are rendered. In one implementation, the display uses electronic paper display technology. In general, an electronic paper display is one that has a high resolution (150 dpi or better) and is bi-stable, meaning that it is capable of holding text or other rendered images even when very little or no power is supplied to the display. The electronic paper display technology may also exhibit high contrast substantially equal to that of print on paper. Some exemplary electronic paper displays that may be used with the implementations described herein include bi-stable LCDs, MEMS, cholesteric, pigmented electrophoretic, and others. One exemplary electronic paper display that may be used is an E Ink-brand display. Touch sensitive technology may be overlaid or integrated with the electronic paper display technology to enable user input via contact or proximity to the screen.

The electronic reader 110 may further be equipped with various input/output (I/O) components 418. Such components may include various user interface controls (e.g., buttons, joystick, keyboard, etc.), audio speaker, connection ports, and so forth.

A network interface 420 supports wired and/or wireless connection to various networks, such as cellular networks, radio, WiFi networks, short range networks (e.g., Bluetooth), IR, and so forth. The network interface 418 facilitates receiving electronic books and other content as discussed herein. Of particular note, the network interface 420 enables wireless delivery of the eBooks 420 over a wireless network.

The electronic reader 110 may also include a battery and power control unit 422. The power control unit operatively controls an amount of power, or electrical energy, consumed by the eBook reader device. Actively controlling the amount of power consumed by the electronic reader 110 may achieve more efficient use of electrical energy stored by the battery.

The electronic reader 110 may have additional features or functionality. For example, the electronic reader 110 may also include additional data storage devices (removable and/or non-removable) such as, for example, magnetic disks, optical disks, or tape. The additional data storage media may include volatile and nonvolatile, removable and non-removable media implemented in any method or technology for storage of information, such as computer readable instructions, data structures, program modules, or other data.

Example Server Components

Figure 5:
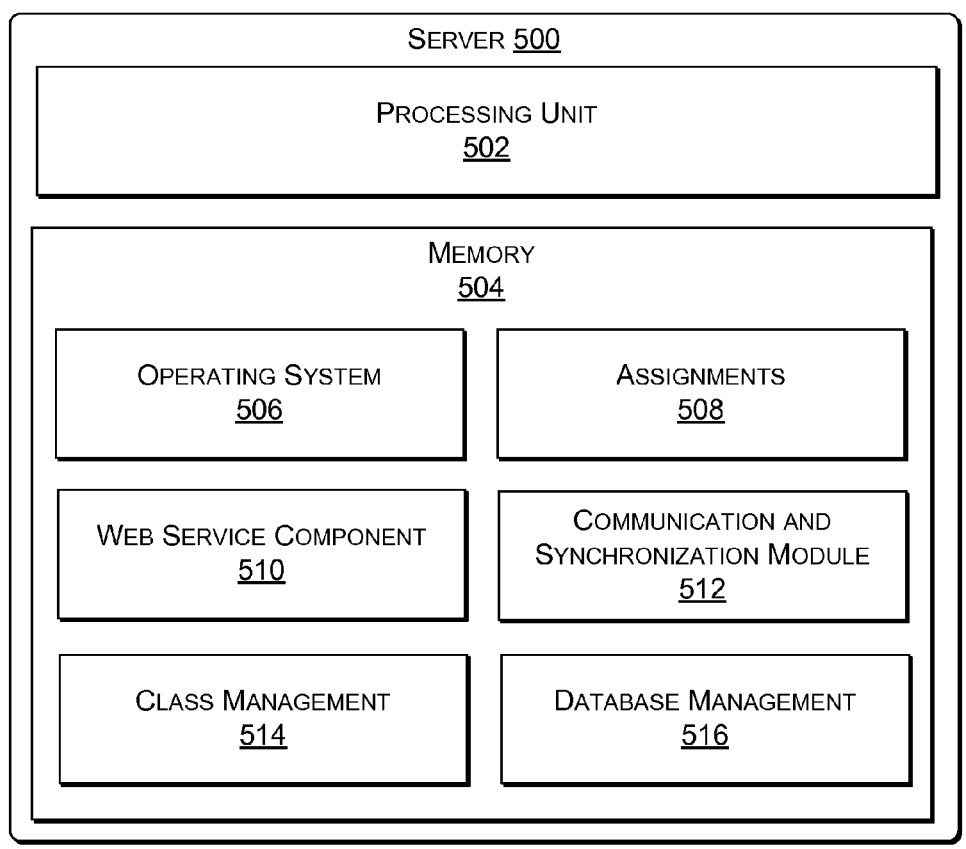
FIG. 5 is a block diagram illustrating components of a server that may be used to implement some of the techniques described herein.

FIG. 5 illustrates relevant components of a server 500 that may be used to implement the functionality of the CSAS 114. Generally, the CSAS 114 may be implemented by one or more servers, with the various functionality described above distributed in various ways across the different servers. Servers may be located together or separately, and organized as virtual servers, server banks, and/or server farms. The described functionality may be provided by the servers of a single entity or enterprise, or may utilize the servers and/or services of multiple entities or enterprises.

In a very basic configuration, an example server 500 may comprise a processing unit 502 composed of one or more processors, and memory 504. The memory 504 is an example of computer storage media and may include volatile and nonvolatile memory. Thus, the memory 504 may include, but is not limited to, RAM, ROM, EEPROM, flash memory, or other memory technology, or any other medium which can be used to store media items or applications and data which can be accessed by the server 500. The memory 504 may also include cloud-based storage services.

The memory 504 may be used to store any number of functional components forming operational logic that is executable on the processing unit 502, as well as data, assignments, and content items that are supplied to consuming devices such as the electronic reader 110. Thus, the memory 504 may store an operating system 506 and a database to store one or more assignments, such as assignments 508.

Functional components of the server 500 may also comprise a web service component 510 that interacts with remote devices such as computers and media consumption devices. The server 500 may also include a communication and synchronization module 512 to communicate with remote devices and to communicate assignments and assignment status with those devices.

The server 500 in some embodiments may include a class management module 514 that works in conjunction with various database or management components 516 for keeping track of users, classes, assignments, etc.

The server 500 may of course include many other logical, programmatic, and physical components, of which those shown in FIG. 5 are merely examples that are related to the discussion herein.

CONCLUSION

Note that the various techniques described above are assumed in the given examples to be implemented in the general context of computer-executable instructions or software, such as program modules, executed by one or more computers or other devices. Generally, program modules include routines, programs, objects, components, data structures, etc. for performing particular tasks or implement particular abstract data types.

Other architectures may be used to implement the described functionality, and are intended to be within the scope of this disclosure. Furthermore, although specific distributions of responsibilities are defined above for purposes of discussion, the various functions and responsibilities might be distributed and divided in different ways, depending on particular circumstances.

Similarly, software may be stored and distributed in various ways and using different means, and the particular software storage and execution configurations described above may be varied in many different ways. Thus, software implementing the techniques described above may be distributed on various types of computer-readable media, not limited to the forms of memory that are specifically described.

Although the subject matter has been described in language specific to structural features and/or methodological acts, it is to be understood that the subject matter defined in the appended claims is not necessarily limited to the specific features or acts described. Rather, the specific features and acts are disclosed as illustrative forms of implementing the claims For example, the methodological acts need not be performed in the order or combinations described herein, and may be performed in any combination of one or more acts.

What is claimed is:

1. A handheld electronic device comprising:
a display upon which electronic books can be rendered;
a processor;
a network interface coupled to the processor and configured to access a server computer via a network;
a memory accessible by the processor and including a stored application operable on the device to distribute class materials, via the network, in an online education environment;
operational logic stored in the memory and executable on the processor such that the processor performs actions comprising:
receiving, via the network interface, a schedule of class assignments from the server computer that identify electronic content for consumption by a student;
storing the schedule of class assignments in the memory;
generating an assignment calendar with the application and based at least in part on the schedule of class assignments stored in the memory;
displaying the assignment calendar on the display;
receiving, via the network interface, the electronic content identified by the schedule of class assignments from the server computer, wherein the electronic content is retrieved by the electronic device at least partly in response to receiving the schedule of class assignments;
displaying the electronic content on the display in response to the student selecting one of the class assignments from the displayed assignment calendar;
generating, with the application, an alert identifying additional class material comprising at least one of an additional class assignment or an additional electronic content item uploaded to the server computer;
providing the alert via the device, wherein:
the application enables the user to select the additional class material based at least in part on the alert, and
the application causes the network interface to download the additional class material from the server computer, via the network, in response to the user selecting the additional class material and when the device is connected to the network;
monitoring interaction of the student with the electronic content or the additional class material, the interaction including selection of one or more pages to be rendered on the display;
generating a notification indicative of the interaction of the student with the electronic content or the additional class material;
transmitting the notification to the server computer using the network interface;
storing interaction information in the memory, the stored interaction information including at least an indication of the one or more pages that are selected to be rendered on the display to allow determining progress of the student relative to individual class assignments;
determining that the student has completed the selected class assignment based at least in part on the stored interaction information;
displaying a prompt on the display to allow a person other than the student to verify completion of the selected class assignment;
receiving a predetermined completion verification code from the person other than the student; and
verifying completion of the selected class assignment.

2. The handheld electronic device of claim 1, wherein the electronic content includes published material that is specified by a class instructor.

3. The handheld electronic device of claim 1, the actions further comprising:
receiving comprehension questions associated with the identified electronic content;
soliciting answers to the comprehension questions from the student; and
reporting the answers to a class instructor.

4. The handheld electronic device of claim 1, the actions further comprising sharing, with another device, highlighting made by the student in the electronic content.

5. The handheld electronic device of claim 1, the actions further comprising:
determining status of the class assignments based at least in part on the interaction information stored in the memory; and
communicating the status of the class assignments from the handheld electronic device to a class schedule and assignment service of the server computer via the network.

6. The handheld electronic device of claim 1, the actions further comprising:
estimating times for the student to perform the class assignments; and
indicating the estimated times in the assignment calendar.

7. The handheld electronic device of claim 1, the actions further comprising:
obtaining estimated times for the student to perform the class assignments based at least in part on the interaction information stored in the memory; and
indicating the estimated times in the assignment calendar.

8. The handheld electronic device of claim 1, wherein verifying completion of the selected class assignment comprises:
transmitting the received verification code to the server computer using the network interface; and
receiving a verification message from the server computer and using the network interface, wherein the verification message is at least partially based on a comparison between the received verification code and an additional verification code associated with the student.

9. The handheld electronic device of claim 1,
wherein the schedule of class assignments is received from a class schedule and assignment service of the server computer, the electronic content is received from a content service of the server computer, and the notification is transmitted to the class schedule and assignment service.

10. A handheld electronic device comprising:
a display upon which electronic books can be rendered;
a processor;

a network interface coupled to the processor and configured to access a server computer via a network;
a memory accessible by the processor and including a stored application operable on the device to enable selection and transfer of class materials, via the network, in an online education environment;
operational logic stored in the memory and executable on the processor such that the processor performs actions comprising:
receiving, via the network interface, class assignments from the server computer that identify electronic content for consumption by a student;
receiving, via the network interface, the electronic content identified by the class assignments from the server computer, wherein the electronic content is retrieved by the electronic device at least partly in response to receiving the schedule of class assignments;
rendering the electronic content on the display in response to interaction with the handheld electronic device by the student;
generating, with the application, an alert identifying additional class material comprising at least one of an additional class assignment or an additional electronic content item uploaded to the server computer;
providing the alert via the device, wherein:
the application enables the user to select the additional class material based at least in part on the alert, and
the application causes the network interface to download the additional class material from the server computer, via the network, in response to the user selecting the additional class material and when the device is connected to the network;
monitoring navigation by the student within the electronic content, the navigation including selection by the student of one or more pages rendered on the display;
generating a notification indicative of the navigation by the student within the electronic content or the additional class material;
transmitting the notification to the server computer using the network interface;
storing navigation information in the memory, the stored navigation information including at least an indication of the one or more pages that are selected to be rendered on the display to allow determining progress of the student relative to individual class assignments;
determining whether the student has completed the selected class assignment based at least in part on the stored navigation information;
displaying a prompt on the display to allow a person other than the student to verify completion of the selected class assignment;
receiving a predetermined completion verification code from the person other than the student; and
reporting completion of the selected class assignment.

11. The handheld electronic device of claim 10, wherein:
the class assignments further identify due dates; and
the actions further comprise:
generating a calendar of assignments based at least in part on their due dates; and
displaying the generated calendar of assignments on the display.

12. The handheld electronic device of claim 10, wherein the electronic content includes published material that is specified by a class instructor.

13. The handheld electronic device of claim 10, wherein the electronic content includes instructor-generated material.

14. The handheld electronic device of claim 10, the actions further comprising:
receiving comprehension questions associated with the identified electronic content;
soliciting answers to the comprehension questions from the student; and
reporting the answers to a class instructor.

15. The handheld electronic device of claim 10, the actions further comprising sharing, with another device, highlighting made by the student in the electronic content.

16. The handheld electronic device of claim 10, the actions further comprising:
determining the progress of the student relative to the individual class assignments based at least in part on the navigation information stored in the memory; and
communicating the determined progress of the student relative to the individual class assignments from the handheld electronic device to an instructor via the network.

17. The handheld electronic device of claim 10, the actions further comprising:
indicating estimated times for completion of individual class assignments based at least in part on the navigation information stored in the memory.

18. A computer-implemented method comprising:
under control of one or more processors of a server computer having access to a network and configured with executable instructions facilitating the transfer of class materials, via the network, in an online education environment,
receiving, with the server computer and via the network, class information from a class instructor, the class information identifying students, verification codes associated with individual students, electronic content, and assignments with respect to the electronic content;
receiving, with the server computer, requests from electronic devices associated with the identified students;
sending, with the server computer, via the network, and at least partly in response to the requests, the electronic content and assignments to the electronic devices associated with the identified students;
receiving, with the server computer and via the network, additional class material from the class instructor, the additional class material comprising at least one of an additional class assignment or an additional electronic content item;
generating, with the server computer, an alert identifying the additional class material;
transmitting the alert, via the network, from the server computer to the electronic devices, wherein a stored application operable on the devices is configured to:
provide the alert,
enable the identified students to select the additional class material based at least in part on the alert, and
request the additional class material from the server computer, via the network, based at least in part on selection of the additional class material;
receiving respective requests, at the server computer, for the additional class material from the electronic devices;
transmitting the additional class material from the server computer to the electronic devices, via the network, in response to the requests and when the electronic devices are connected to the network;
receiving, with the server computer, device usage notifications from the electronic devices associated with the identified students, the device usage notifications being based at least in part on content navigation by individual students relative to the electronic content, or the additional class material, and stored in memory on respective ones of the electronic devices in response to monitoring of the content navigation;

determining, with the server computer, assignment progress of individual students based at least in part on the device usage notifications;

receiving, with the server computer, a verification code from an electronic device associated with a particular student, wherein the verification code is received from a person other than the particular student;

verifying, with the server computer, assignment progress at least partially based on comparing the received verification code to the verification code associated with the particular student; and sending, with the server computer, the assignment progress and verification to the class instructor.

19. The computer-implemented method of claim 18, further comprising summarizing the assignment progress for a plurality of the students.

20. The computer-implemented method of claim 18, wherein the class information identifies assignment dates.

21. The computer-implemented method of claim 18, wherein the device usage notifications indicate page turns.

22. The computer-implemented method of claim 18, wherein the device usage notifications indicate viewings of individual pages.

23. The computer-implemented method of claim 18, wherein the device usage notifications indicate viewing times of individual pages.

24. The computer-implemented method of claim 18, wherein the electronic content includes instructor-generated material.

25. The computer-implemented method of claim 18, wherein the electronic content includes published material that is specified by the class instructor.

26. The computer-implemented method of claim 18, further comprising:

accepting comprehension questions associated with the identified electronic content from the class instructor;

delivering the comprehension questions to the electronic devices used by the students; and reporting responses to the comprehension questions to the class instructor.

27. The computer-implemented method of claim 18, wherein the device usage notifications indicate highlighting made by the students in the electronic content.

28. The computer-implemented method of claim 18, further comprising estimating times for the students to perform the class assignments based at least in part on the device usage notifications.

* * * * *